United States Patent
Hong et al.

(10) Patent No.: US 10,813,055 B2
(45) Date of Patent: Oct. 20, 2020

(54) UPLINK RESOURCE ALLOCATION METHOD AND COGNITIVE SMALL CELL NETWORK SYSTEM FOR EXECUTING SAME

(71) Applicant: UNIVERSITY-INDUSTRY COOPERATION GROUP OF KYUNG HEE UNIVERSITY, Yongin-si (KR)

(72) Inventors: Choong Seon Hong, Yongin-si (KR); Tuan Leanh, Suwon-si (KR); Sung Su Kim, Suwon-si (KR)

(73) Assignee: UNIVERSITY-INDUSTRY COOPERATION GROUP OF KYUNG HEE UNIVERSITY, Yongin-si (KR)

( * ) Notice: Subject to any disclaimer, the term of this patent is extended or adjusted under 35 U.S.C. 154(b) by 0 days.

(21) Appl. No.: 16/720,207

(22) Filed: Dec. 19, 2019

(65) Prior Publication Data
US 2020/0145928 A1    May 7, 2020

Related U.S. Application Data

(62) Division of application No. 16/062,659, filed as application No. PCT/KR2016/014625 on Dec. 14, 2016, now Pat. No. 10,524,211.

(30) Foreign Application Priority Data

Dec. 15, 2015  (KR) .................. 10-2015-0179542
Jan. 15, 2016  (KR) .................. 10-2016-0005368

(51) Int. Cl.
*H04W 52/14*       (2009.01)
*H04W 52/26*       (2009.01)
(Continued)

(52) U.S. Cl.
CPC ......... *H04W 52/146* (2013.01); *H04W 16/10* (2013.01); *H04W 16/32* (2013.01);
(Continued)

(58) Field of Classification Search
CPC ..... H04W 16/10; H04W 16/14; H04W 16/32; H04W 52/146; H04W 52/267; H04W 52/34; H04W 76/18; H04W 72/0413
See application file for complete search history.

(56) References Cited

U.S. PATENT DOCUMENTS 5,903,608 A  *  5/1999  Chun ................. H04L 27/2602
                                                      375/260
2003/0050069 A1* 3/2003 Kogiantis ......... H04W 72/1226
                                                      455/450
(Continued)

FOREIGN PATENT DOCUMENTS

KR    10-2010-0123344    11/2010
KR    10-1172657          8/2012
(Continued)

OTHER PUBLICATIONS

T. Leanh et al., "User Association and sub-channel allocation in uplink Cognitive Smallcell Network", Journal of Korea Computer Congress 2015 of the Korea Institute of Information and Engineers, pp. 1238-1240, Jun. 2015 (http://www.dbpia.co.kr/Article/NODE06394369).
(Continued)

*Primary Examiner* — Dominic E Rego
(74) *Attorney, Agent, or Firm* — Lex IP Meister, PLLC

(57) ABSTRACT

Disclosed are an uplink resource allocation method and a cognitive small cell network system performing the method. In the method, a small cell manager collects an access request from a small cell user and forms a preference relationship for each small cell user. Then, sub-channel-
(Continued)

specific transmission power for providing a maximum data transmission rate at the time of uplink transmission is calculated and the calculated sub-channel-specific transmission power information is transferred to the small cell user. Meanwhile, the small cell user forms all possible sub-channel-specific preference relations and thereafter, transmits the access request for each sub-channel having a maximum preference relationship to the small cell manager. Thereafter, the small cell user performs power allocation for each access-determined sub-channel by using the transmission power information transferred from the small cell manager and performs data transmission through the access-determined sub-channel by using the allocated power.

4 Claims, 5 Drawing Sheets

(51) Int. Cl.
| | | |
|---|---|---|
| H04W 52/34 | (2009.01) | |
| H04W 16/10 | (2009.01) | |
| H04W 16/32 | (2009.01) | |
| H04W 72/04 | (2009.01) | |
| H04W 76/18 | (2018.01) | |
| H04W 16/14 | (2009.01) | |

(52) U.S. Cl.
CPC ......... H04W 52/267 (2013.01); H04W 52/34 (2013.01); H04W 72/0413 (2013.01); H04W 76/18 (2018.02); H04W 16/14 (2013.01)

(56) References Cited

U.S. PATENT DOCUMENTS

| | | | | |
|---|---|---|---|---|
| 2003/0185311 | A1* | 10/2003 | Kim | .................... H04L 27/2608 375/260 |
| 2005/0068884 | A1* | 3/2005 | Yoon | ....................... H04L 5/006 370/203 |
| 2005/0277444 | A1* | 12/2005 | Rensburg | .......... H04W 72/1273 455/562.1 |
| 2006/0078059 | A1* | 4/2006 | Ok | ....................... H04L 27/2608 375/260 |
| 2007/0218950 | A1* | 9/2007 | Codreanu | ............. H04W 52/42 455/562.1 |
| 2009/0325622 | A1* | 12/2009 | Matsumura | .......... H04B 7/2606 455/522 |
| 2010/0124930 | A1* | 5/2010 | Andrews | ........... H04W 72/0446 455/436 |
| 2011/0103339 | A1* | 5/2011 | Kim | ...................... H04W 16/02 370/329 |
| 2013/0003666 | A1* | 1/2013 | Oh | ...................... H04W 72/082 370/329 |
| 2014/0321304 | A1* | 10/2014 | Yu | ....................... H04W 52/367 370/252 |
| 2015/0036622 | A1* | 2/2015 | Yang | ................. H04W 74/0833 370/329 |
| 2015/0055633 | A1* | 2/2015 | Wu | ....................... H04J 3/1694 370/336 |
| 2016/0204899 | A1* | 7/2016 | Kojima | ............ H04W 14/0298 714/776 |

FOREIGN PATENT DOCUMENTS

| | | |
|---|---|---|
| KR | 10-2013-0068015 | 6/2013 |
| KR | 10-2015-0086741 | 7/2015 |

OTHER PUBLICATIONS

H. Zhang et al., "Resource Allocation for Cognitive Small Cell Networks: A Cooperative Bargaining Game Theoretic Approach", IEEE Transactions on Wireless Communications, vol. 14, No. 6, pp. 3481-3493, Jun. 2015 (https://www.researchgate.net/publication/273060943).

* cited by examiner (a)

Number of CSUEs
(b)

UPLINK RESOURCE ALLOCATION METHOD AND COGNITIVE SMALL CELL NETWORK SYSTEM FOR EXECUTING SAME

TECHNICAL FIELD

The present invention relates to an uplink resource allocation method and a cognitive small cell network system performing the method.

BACKGROUND ART

With the widespread use of portable terminals and tablet PCs and the rapid expansion of mobile computing based on wireless Internet technology, a dramatic increase in a wireless network capacity is required.

In many studies, it is predicted that traffic usage of mobile users will increase rapidly in the future. As a representative solution to meet the requirements according to such explosive traffic growth, a method that applies an evolved physical layer technique or allocates an additional spectrum may be considered. However, the physical layer technology reaches a theoretical limit, and increasing a capacity of a cellular network through the allocation of the additional spectrum cannot be a fundamental solution.

Accordingly, as a method for efficiently supporting user data traffic that explosively increases in the cellular network, a method of providing a service by densely installing more small cells with a smaller size by reducing the size of a cell can be considered as a practical alternative.

Meanwhile, proposed is cognitive radio technology which is frequency sharing technology in which by measuring a propagation environment so that different types of wireless communication services can use the same frequency, a user who is granted permission to use a frequency in the related art can search for an idle frequency that is not being used and performs communication at the frequency.

Appropriate resource allocation should be performed to protect the macro base station in a cognitive small cell network (CSN) that incorporates the cognitive radio communication technology in such a small cell network and to guarantee the minimum data transmission rate requirement of a cognitive small cell user.

However, in the case of uplink transmission in the cognitive small cell network, a resource allocation condition for maximizing the total data transmission rate during uplink data transmission while protecting a macro base station and guaranteeing the minimum data transmission rate requirement of the cognitive small cell user is difficult to optimize due to an NP-hard problem.

DISCLOSURE

Technical Problem

The present invention has been made in effort to provide an uplink resource allocation method which is capable of maximizing a total data transmission rate in uplink data transmission while protecting a macro base station and guaranteeing the minimum data transmission rate requirement of a cognitive small cell user in a cognitive small cell network environment and a cognitive small cell network system for performing the method.

Technical Solution

An exemplary embodiment of the present invention provides a method for allocating an uplink resource by a small cell manager in a cognitive small cell network, the method including: collecting an access request from a small cell user; forming a preference relationship for each small cell user; calculating sub-channel-specific transmission power to provide a maximum data transmission rate during uplink transmission; and transmitting calculated sub-channel-specific transmission power information to the small cell user.

Herein, the calculating of the sub-channel-specific transmission power may include determining whether it is possible to provide a maximum data transmission rate at the time of uplink transmission, rejecting an access request for a small cell user having a lowest preference relationship when it is not possible to provide the maximum data transmission rate at the time of the uplink transmission, and when it is possible to provide the maximum data transmission rate at the time of the uplink transmission, admitting the access request to the small cell user and calculating sub-channel-specific transmission power.

Further, the rejecting of the access request may be repeatedly performed with respect to small cell users which are not rejected among the small cell users that make the access request until the maximum data transmission rate is enabled to be provided during the uplink transmission.

In addition, the preference relationship for each small cell user may be estimated by a utility value for a sub-channel requested to be accessed by the small cell user and the utility value may be calculated by using the following relationship equation $$U_{nm}(k) = \frac{R_{nm}^k - R_n^{min}}{R_n^{min}} - \beta P_{nm}^k g_{nm,0}^k \max\left(0, \frac{\sum_{\forall n}\sum_{\forall m} y_{nmk} P_{nm}^k g_{nm,0}^k - I_{0,k}^{th}}{I_{0,k}^{th}}\right)$$

-Where $R_{nm}^k$ represents a data transmission rate of the small cell user n when the small cell user n uses sub-channel k for a small cell base station m, $R_n^{min}$ represents a minimum data transmission rate requirement of the small cell user n, $\beta$ represents a weight parameter for capturing a system throughput reduction degree, $P_{nm}^k$ represents power allocated between the small cell user n and the small cell base station m on sub-channel k, $y_{nmk}$ represents whether sub-channel k is allocated between the small cell user n and the small cell base station m, $g_{nm,0}^k$ represents a channel gain between the small cell base station m and the small cell user (n) on sub-channel k, and $I_{0,k}^{th}$ represents an interference power threshold preset with respect to sub-channel k in a macro base station.

Further, whether it is possible to provide the maximum data transmission rate at the time of the uplink transmission may be determined through the following relationship equation $$\max_{Y,P} \sum_{(n,m) \in N_k^{req}} R_{nm}^k$$

$$\sum_{(n,m) \in N_k^{req}} g_{nm}^k P_{nm}^k \leq I_{0,k}^{th}, \forall k \quad \text{C1'}$$

$$R_{nm}^k \geq R_n^{min}, \forall n, m \in N_k^{req} \quad \text{C2'}$$

$$\sum_{n=1}^{N_m} y_{nmk} \leq 1, \forall m, k \quad \text{C3}$$

-continued $$y_{nmk} = \{0, 1\}, \forall\, m, n, k \quad \text{C4}$$

$$P_{nmk} \in [P_n^{min}, P_n^{max}], \forall\, m, n, k \quad \text{C5}'$$

Stability     C6'

Where $N_k^{req}$ represents a set of small cell users that make the access request and $P_{nmk}$ represents the power allocated between the small cell user n and the small cell base station m on sub-channel k.

Further, in the calculating of the sub-channel-specific transmission power, the sub-channel-specific transmission power may be calculated by solving a concave problem of a variable for the power in the above relationship equation.

Another exemplary embodiment of the present invention provides a method for allocating an uplink resource by a cognitive small cell user equipment in a cognitive small cell network, the method including: forming a preference relationship for each of all possible sub-channels; transmitting an access request for a sub-channel having a maximum preference relationship to a small cell manager; performing power allocation for each access-determined sub-channel by using transmission power information transferred from the small cell manager; and performing data transmission through the access-determined sub-channel by using allocated power.

Herein, the method may further include: between the transmitting to the small cell manager and the performing of the power allocation, receiving an answer for the access request; and determining whether the access request is admitted through the answer, in which when it is determined that the access request is admitted, the performing of the power allocation may be performed, and when it is determined that the access request is rejected, the transmitting to the small cell manager may be repeatedly performed until the access request is admitted.

Further, the method may further include, before the forming of the sub-channel-specific preference relation, receiving possible sub-channel information from a small cell base station through broadcasting.

Further, the sub-channel-specific preference relationship may be formed by assuming uniform transmission power to all possible sub-channels.

In addition, the sub-channel-specific preference relationship may be estimated by utility values of all possible sub-channels, and the utility value may be calculated by the following relationship equation $$U_{nm}(k) = R_{nm}^k$$

Where $R_{nm}^k$ represents a data transmission rate of a small cell user n when the small cell user n uses sub-channel k with respect to a small cell base station m, and the $R_{nm}^k$ may be calculated by the following relationship equation.

$$R_{nm}^k = B_k \log_2\left(1 + \frac{g_{nm}^k P_{nm}^k}{g_{nm}^k P_{k0}^k + \sigma^2}\right)$$

Where $B_k$ represents a bandwidth of sub-channel k, $g^{nmk}$ is a channel gain between small cell user equipment n and a small cell base station m, $P_{nm}^k$ represents power allocated between small cell user equipment n and the small cell base station m, $g_{km}^k P_{k0}^k$ represents a interference level of a macro user k in the small cell base station m, and $\sigma^2$ represents Gaussian noise at the small cell base station.

Yet another exemplary embodiment of the present invention provides a cognitive small cell network system including: a plurality of small cell users forming a preference relationship for each possible sub-channel and each performing an access request based on the formed sub-channel-specific preference relation; and a small cell manager receiving the access request from the plurality of small cell users, forming the preference relationship for each small cell user which requests an access and thereafter, calculating sub-channel-specific transmission power for providing a maximum data transmission rate at the time of uplink transmission and transferring the calculated transmission power to the small cell user which requests the access.

Herein, the small cell user may transmit to the small cell manager the access request through the sub-channel having a maximum preference relationship among the possible sub-channel-specific preference relations.

Further, the small cell manager may reject the access request of the small cell user which is not capable of providing the maximum data transmission rate at the time of uplink transmission among the small cell users which request the access, and the small cell user of which the access request is rejected may perform the access request based on the sub-channel-specific preference relationship until the access request is admitted.

In addition, when the small cell manager rejects the access request of the small cell user, the small cell manager may reject the access request of the small cell user having a lowest preference relationship among the small cell users which request the access.

Advantageous Effects

According to exemplary embodiments of the present invention, the total data transmission rate in uplink data transmission can be maximized while protecting a macro base station and guaranteeing a minimum data transmission rate requirement of a cognitive small cell user in a cognitive small cell network environment.

MODE FOR INVENTION

Figure 1:
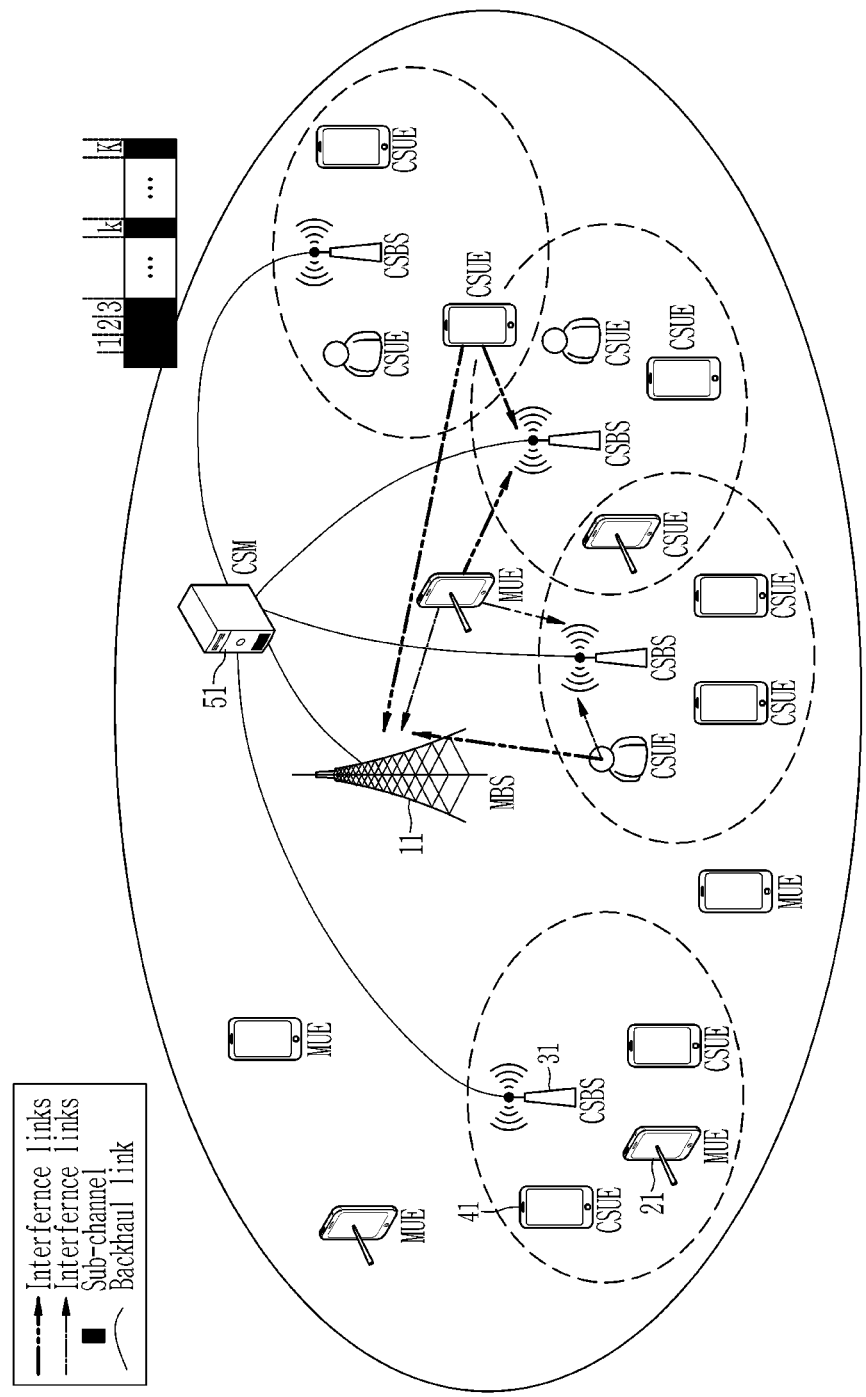
FIG. 1 is a schematic configuration diagram of a cognitive small cell network 10 according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising", will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

First, a system model for uplink resource allocation in a cognitive small cell network will be described.

FIG. 1 is a schematic configuration diagram of a cognitive small cell network 10 according to an exemplary embodiment of the present invention. In FIG. 1, for easy description, a macro base station 11 is referred to as a macro base station (MBS), a user 21 of the macro base station 11 is referred to as macro user equipment (MUE), a base station 31 of a cognitive small cell is referred to as a (cognitive small cell base station (CSBS), and a user 41 of the cognitive small cell is referred to as cognitive small cell user equipment (CSUE).

Referring to FIG. 1, an uplink cognitive small cell network configured by a set of M={1 . . . m} CSBSs is considered.

Each CSBS m has a set of $N_m$ CSUEs.

$$N = \bigcup_{m \in M} N_m$$

may be represented by a set of all CSUEs in a network.

There is K={1, 2 . . . k} which is a set of sub-channels used from the MBS 11. It is assumed that there is no interference between small cells.

Each CSUE may be permitted to access most sub-channels. Cognitive small cell management (CSM) 51 is disposed to protect the MBS and manage QoS of the CSUE.

Further, an interference power threshold preset for each sub-channel k in the MBS 11 is $l_{0,k}{}^{th}$. In addition, each CSUE n has a minimum data transmission rate requirement $R_n^{min}$.

Meanwhile, when the CSUE n uses the sub-channel k for the CSBS m, a data transmission rate of the CSUE n may be obtained as shown in [Equation 1].

$$R_{nm}^k = B_k \log_2\left(1 + \frac{g_{nm}^k P_{nm}^k}{g_{nm}^k P_{k0}^k + \sigma^2}\right) \quad \text{[Equation 1]}$$

Where $B_k$ represents a bandwidth of sub-channel k, $g_{nm}{}^k$ is a channel gain between nth CSUE and mth CSBS on sub-channel k, $Pnm^k$ represents power allocated between nth CSUE and mth CSBS on sub-channel k, $g_{km}{}^k P_{k0}{}^k$ represents a interference level of MUE k at CSBS m, and $\sigma^2$ represents Gaussian noise at CSBS.

To protect the MBS 11 and guarantee the QoS of the CSUE 31, a problem of the sub-channel and power allocation is formulated as [Equation 2].

[Equation 2]

$$\max_{Y,P} \sum_{m=1}^{M} \sum_{n=1}^{N_m} \sum_{k=1}^{K} y_{nmk} R_{nm}^k \quad (1)$$

$$\sum_{m=1}^{M} \sum_{n=1}^{N_m} y_{nmk} g_{nm}^k P_{nm}^k \le I_{0,k}^{th}, \forall k \quad C1$$

$$\sum_{k=1}^{K} y_{nmk} R_{nm}^k \ge R_n^{min}, \forall n, m \quad C2$$

$$\sum_{n=1}^{N_m} y_{nmk} \le 1, \forall m, k \quad C3$$

$$y_{nmk} = \{0, 1\}, \forall m, n, k \quad C4$$

$$P_{nmk} \in [P_n^{min}, P_n^{max}], \forall m, n, k \quad C5$$

Stability $\quad$ C6

In [Equation 2], an object 1 represents total network throughput in an uplink CSN 10 and has six constraints for the object 1. Constraint 1 (C1) is a constraint for MBS protection, Constraint 2 (C2) describes a minimum data transmission rate requirement for each CSUE, and Constraint 3 (C3) indicates that CSUE is allocated in most sub-channels, and in Constraint 4 (C4), sub-channel index $y_{nmk}=1$ indicates that sub-channel k is allocated from CSBS m to CSUE n, otherwise $y_{nmk}=0$, and Constraint 5 (C5) represents transmission power range of CSUE n, and Constraint 6 (C6) means that in a next section, it is guaranteed that a last matching is a stable group.

Optimization with respect to the sub-channels and the power allocation to maximize the total network throughput in the uplink CSN 10 while protecting the MBS 11 through the constraints and meeting the minimum data transmission rate requirements of the CSUEs through the constraints may become the NP hard problem.

Therefore, in order to solve the problem, an exemplary embodiment of the present invention based on a one-to-many matching game approach will be described.

Figure 2:
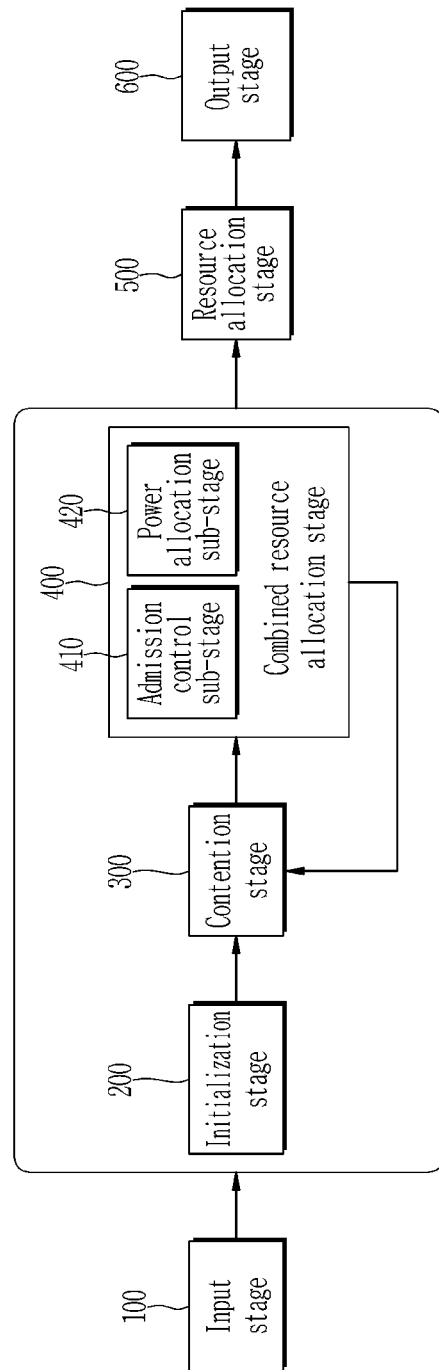
FIG. 2 is a diagram illustrating a schematic configuration of a framework for uplink resource allocation in a cognitive small cell network according to an exemplary embodiment of the present invention.

FIG. 2 is a diagram illustrating a schematic configuration of a framework for uplink resource allocation in a cognitive small cell network according to an exemplary embodiment of the present invention.

Referring to FIG. 2, a framework for uplink resource allocation in the cognitive small cell network according to an exemplary embodiment of the present invention proposes a design according to a distributed algorithm based on a one-to-many matching game.

First, the framework according to an exemplary embodiment of the present invention includes an input stage 100, an initialization stage 200, a contention stage 300, a combined resource allocation stage 400, a resource allocation stage 500, and an output stage 600.

The input stage 100 prepares input parameters of an original problem (Equation 2), which are constituted by the CSUE 41, possible sub-channels, a QoS request of the CSUE 41, and an interference threshold in order to protect the macro base station 11.

The initialization stage 200 performs initialization to prepare for the next contention stage 300. In this stage, the CSBS 31 broadcasts possible sub-channel information to the CSUEs 41 thereof. Therefore, the CSUE 41 estimates utility function values for each sub-channel assuming uniform transmission power for all possible sub-channels. Thereafter, the estimated utility function values are stored as a preference relationship of the CSUE 41, i.e., $\succ_n$.

In the contention stage 300, the CSUE 41 transmits a proposal of the most preferred sub-channel in the preference relation. That is, the CSUE 41 transmits the sub-channel information corresponding to having the highest preference relationship value to the CSBS 31, and the CSBS 31 transmits the proposal for the sub-channel from the CSUE 41 to the CSM 51 performing an admission control.

The combined resource allocation stage 400 is constituted by two sub-stages: an admission control sub-stage 410 and a power allocation sub-stage 420.

At the admission control sub-stage 410, which is a first sub-stage, the CSM 51 collects information from the proposed CSUE 41 for each sub-channel. Thereafter, the CSM 51 selects the CSUE 41 that may access the sub-channel as an access admission group to guarantee a minimum rate and MBS protection on each sub-channel. In the sub-stage 410, requested accesses of some CSUEs 41 to the sub-channel will be rejected by the CSM 51.

Next, in the power allocation sub-stage 420 which is a second sub-stage, power allocation is performed on the CSUE 41 admitted by the CSM 51.

The CSUE 41 rejected in a practice game returns to the previous contention stage 300 and enters a contention again. The contention stage 300 ends when there is no new request from the CSUE 41 to the CSM 51.

In the resource allocation stage 500, the CSUE 41 performs the power allocation for each sub-channel determined by the CSM 51 in the power allocation sub-stage 420.

In the output stage 600, the CSUE 41 performs data transmission over the CSBS 31 with the optimal sub-channel and power allocated in the resource allocation stage 500.

Hereinafter, an exemplary embodiment of the present invention described above will be described in more detail.

First, a one-to-many matching is used between two sets N and K satisfying Constraints 1 to 6 (C1 to C6) in [Equation 2].

Proposal 1:

[Equation 2] is formulated as the one-to-many matching game.

A matching-based sub-channel allocation problem is defined by a tuple as a function from (N, M, $\succ_n$, $\succ_k$, $q_n=1$, $q_k=N_k$). Where $q_k$ as a quato of sub-channel k in the CSM 51 represents the maximum number of CSUEs that may be allocated to sub-channel k. The $q_k$ is a dynamic limit dependent on constraints 1, 2, 5, and 6 (C1, C2, C5, and C6). Parameter $q_n$ is a limit of CSUE n described as Constraint 3 (C3). The proposed solution is a matching function of $\mu_{SCA}$:N∪K→N∪K matching game, which provides a final allocation between CSUE and CSBS based on preference functions $\succ_n$ and $\succ_k$.

In the proposed matching game, two preference relations $\succ_n$ and $\succ_k$ are formulated based on the following utility functions.

CSUE Utility:

A utility value ($\succ_n$) of each CSUE n forms a preference relationship for sub-channel k as in [Equation 3].

$$U_{nm}(k) = R_{nm}^k \quad \text{[Equation 3]}$$

CSM Utility for Each Sub-Channel:

On the CSM 51 side, the CSM 51 estimates a utility value ($\succ_k$) for each sub-channel k given to CSUE n requested in CSBS m, as shown in [Equation 4].

$$U_{nm}(k) = \frac{R_{nm}^k - R_n^{min}}{R_n^{min}} - \beta P_{nm}^k g_{nm,0}^k \max\left(0, \frac{\sum_{\forall n}\sum_{\forall m} y_{nmk} P_{nm}^k g_{nm,0}^k - I_{0,k}^{th}}{I_{0,k}^{th}}\right) \quad \text{[Equation 4]}$$

Where in Equation 4, a first term represents a measurement that quantifies a satisfaction of Constraint 2 (C2) and a second term represents a measurement that quantifies a violation degree of Constraint 1 (C1).

In the proposed matching game, $N_k$ is a dynamic limit dependent on the request by the CSM 51 as follows.

CSM Request:

When a set of CSUEs requested for sub-channel k, $N_k^{req}$ is given, the CSM 51 has the sub-channel and power allocation strategy in order to maximize the total data transmission rate for sub-channel k while ensuring MBS protection and a minimum rate of CSUE. From the existing [Equation 2], the request function of the CSM 51 is formulated as shown in [Equation 5].

[Equation 5]

$$\max_{Y,P} \sum_{(n,m)\in N_k^{req}} R_{nm}^k$$

$$\sum_{(n,m)\in N_k^{req}} g_{nm}^k P_{nm}^k \leq I_{0,k}^{th}, \forall k \quad\quad C1'$$

$$R_{nm}^k \geq R_n^{min}, \forall n, m \in N_k^{req} \quad\quad C2'$$

$$P_{nmk} \in [P_n^{min}, P_n^{max}], \forall m, n, k \quad\quad C5'$$

Stability $\quad\quad C6'$

Applying an unmodified constraint in [Equation 5] is as in Equation 6 below.

[Equation 6]

$$\max_{Y,P} \sum_{(n,m)\in N_k^{req}} R_{nm}^k$$

$$\sum_{(n,m)\in N_k^{req}} g_{nm}^k P_{nm}^k \leq I_{0,k}^{th}, \forall k \quad\quad C1'$$

$$R_{nm}^k \geq R_n^{min}, \forall n, m \in N_k^{req} \quad\quad C2'$$

$$\sum_{n=1}^{N_m} y_{nmk} \leq 1, \forall m, k \quad\quad C3$$

$$y_{nmk} = \{0, 1\}, \forall m, n, k \quad\quad C4$$

$$P_{nmk} \in [P_n^{min}, P_n^{max}], \forall m, n, k \quad\quad C5'$$

Stability*90 $\quad\quad C6'$

It can be seen that a feasible solution given for [Equation 6] is a concave problem in variable P. Thus, [Equation 6] may be solved using some solutions such as a CVX toolbox for convex in already well-known matlab (matrix laboratory) software.

In the proposed game, if [Equation 6] is not feasible, the CSUE at the set $N_k^{req}$ at the contention stage 300 will be eliminated by the CSM 51 to have the smallest preference relationship, i.e. lowest $U_{nm}(k)$.

Hereinafter, from the above proposals and settings, an uplink resource allocation method in the cognitive small cell network according to a distribution algorithm based on a one-to-many matching game will be described in order to solve [Equation 6].

Figure 3:
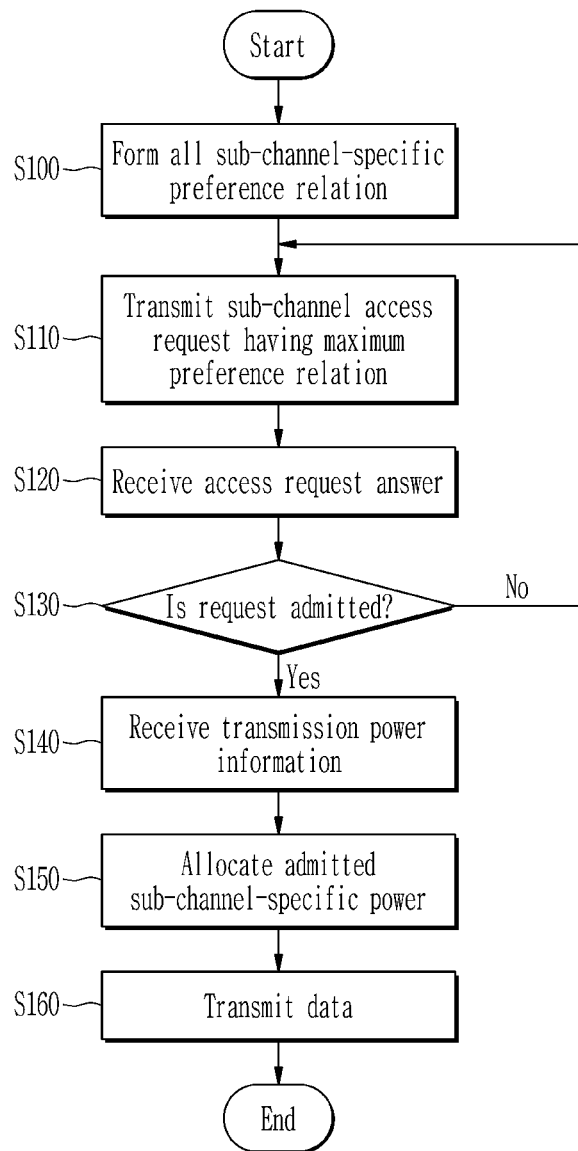
FIG. 3 is a flowchart of an uplink resource allocation method at a CSUE side according to an exemplary embodiment of the present invention.
Figure 4:
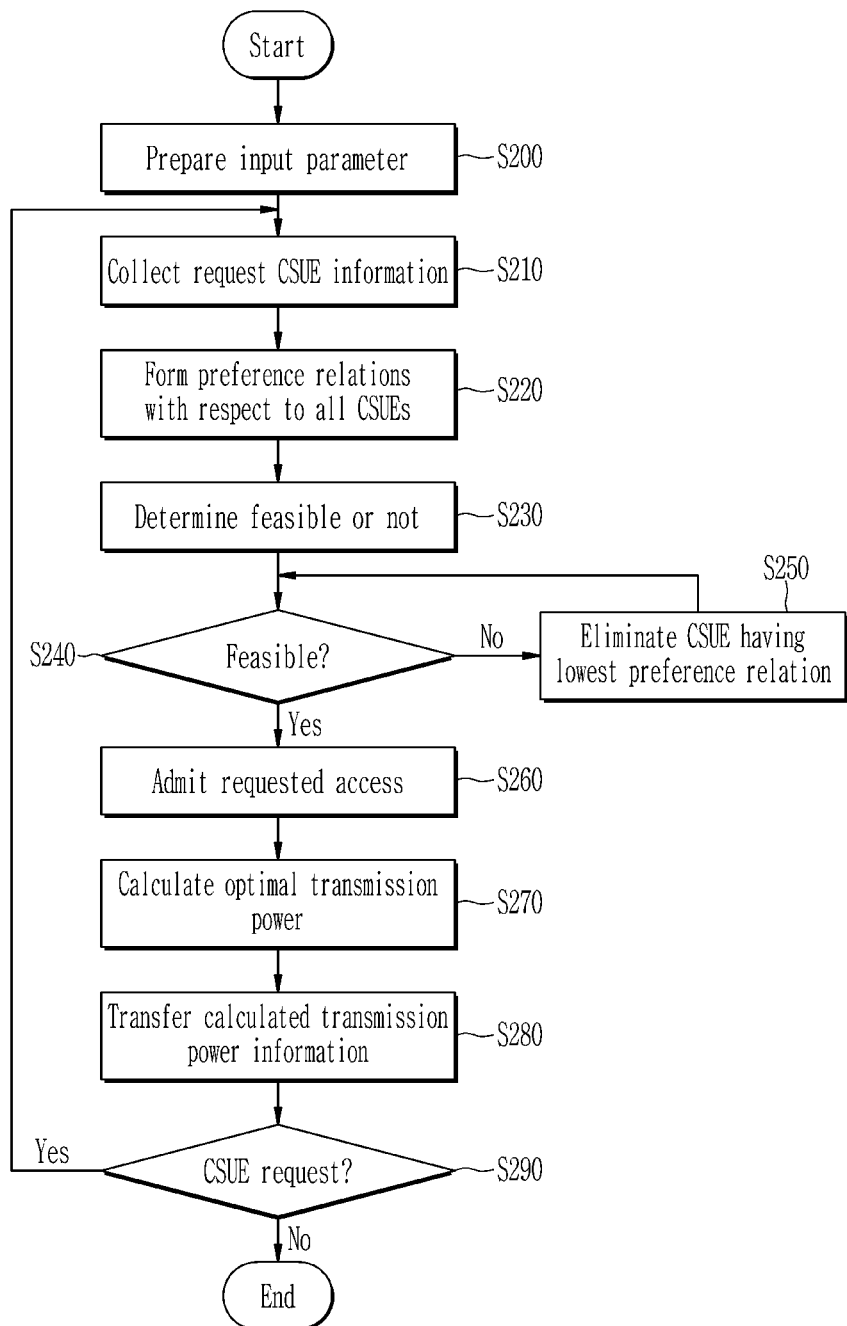
FIG. 4 is a flowchart of the uplink resource allocation method at a CSM side according to an exemplary embodiment of the present invention.

FIG. 3 is a flowchart of an uplink resource allocation method at a CSUE side according to an exemplary embodiment of the present invention and FIG. 4 is a flowchart of the uplink resource allocation method at a CSM side according to an exemplary embodiment of the present invention.

First, the uplink resource allocation method at the CSUE 41 side will be described with reference to FIG. 3.

It will be appreciated that an exemplary embodiment of the present invention is described using one CSUE 41 but may be applied to other CSUEs.

First, the CSUE 41 forms a preference relationship ($\succ_n$) for each sub-channel belonging to the set K by using the possible sub-channel information transmitted from the CSBS 31 through broadcasting (S100). In this case, the sub-channel-specific preference relationship ($\succ_n$) may be calculated as the utility value of the CSUE 41 through [Equation 3] above.

Thereafter, the CSUE 41 transmits a request for accessing the sub-channel having a maximum value among the sub-channel-specific preference relations to the CSM 51 (S110). Herein, the sub-channel k selected by the CSUE 41 becomes arg max ($\succ_n$).

As described above, the CSUE 41 that transmits the access request to the CSM 51 waits for an answer from the CSM 51 as to whether the request is admitted or rejected.

Thereafter, when the answer to the access request is received from the CSM 51 (S120), it is determined whether the access request is admitted (S130), and if the access request is admitted, the power allocation information is received from the CSM 51 (S140).

Thereafter, the CSUE 41 performs the sub-channel-specific power allocation in the CSUE 41 using the power allocation information received in step S140 (S150).

Then, the CSUE 41 performs data transmission to the CSBS 31 using the admitted sub-channel and the allocated optimal power (S160).

Meanwhile, when the access request is rejected in step S130, the CSUE 41 repeats steps S110, S120, and S130 until the access request is admitted. That is, the CSUE 41 continues to participate in the contention with other CSUEs until the access request is admitted.

Next, the uplink resource allocation method at the CSUE 51 side will be described with reference to FIG. 4.

First, the CSM 51 prepares input parameters of an original problem (Equation 2), which are constituted by the CSUE 41, possible sub-channels, a QoS request of the CSUE 41, and an interference threshold in order to protect the macro base station 11 (S200).

Next, information on all CSUEs including the CSUE 41 that transmits the access request is collected to form $N_k^{req}$ (S210).

Thereafter, a preference relationship ($\succ_k$) is formed for all CSUEs belonging to $N_k^{req}$ (S220). In this case, the preference relationship ($\succ_n$) for each CSUE may be calculated as the utility value of the CSM 51 through [Equation 4] above.

Next, the CSM 51 determines whether the CSUE may be executed through [Equation 6] (S230).

When it is determined that the CSUE is not executable (S240), the CSUE having the lowest preference relationship ($\succ_k$) is removed (S250). In addition, the CSUE removal step (S250) is repeated until the resource allocation according to an exemplary embodiment of the present invention is executable.

Meanwhile, when it is determined in step S240 that the resource allocation is executable, the request access is admitted to the CSUEs remaining in $N_k^{req}$ and the corresponding CSUE is included in $N_k^{accepted}$ (S260).

Then, optimal transmission power that may provide the maximum data transmission rate is calculated by using [Equation 2] using the CVX tool box (S270).

In addition, the calculated transmission power information is transmitted to the access admitted CSUEs together with the access admission as a response to the access request (S280).

Meanwhile, when there is the access request from the CSUE, the CSM 51 repeats steps S210 to S290 above.

Hereinafter, a simulation result of the resource allocation method according to an exemplary embodiment of the present invention will be described with reference to FIG. 5.

In the case of simulation, a simulation performed in Matlab to evaluate performance according to an exemplary embodiment of the present invention is shown.

Considered is a two-tier network in which M=5 CSBS is located with the MBS 11. Some parameters are set as follows. $P_{nm}^{max}$=100 mW, $1_0^{th}$=−75 dBmW, $\sigma^2$=−105 dBm, $B_k$=360 kHz, K=5 subchannel.

The channel gain is assumed to be a Rayleigh random variable with an average value h (d)=$h_0$ $(d/15)^{-4}$, where $h_0$ represents a reference channel gain at a distance of 15 m.

Figure 5:
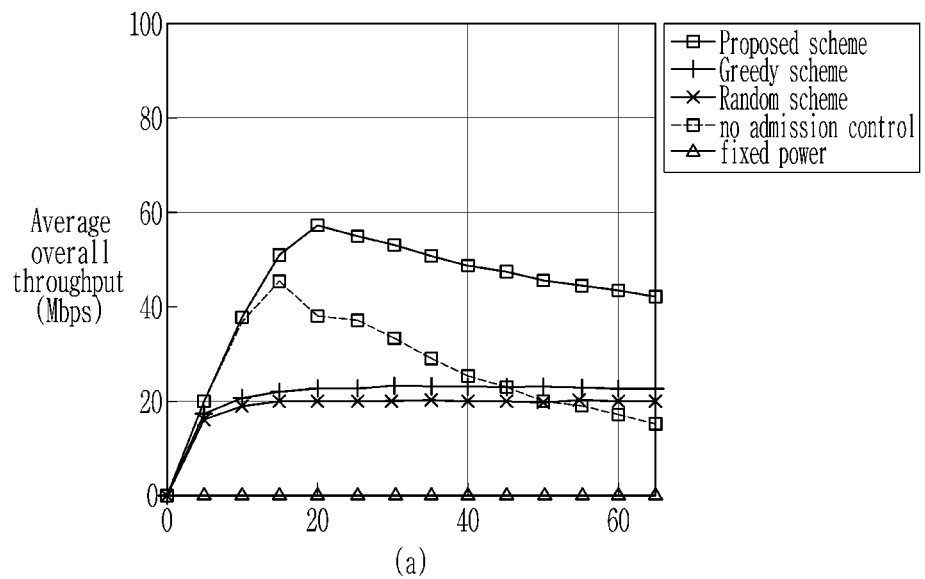
FIG. 5 is a diagram illustrating a simulation result of the uplink resource allocation method according to an exemplary embodiment of the present invention.
Figure 5:
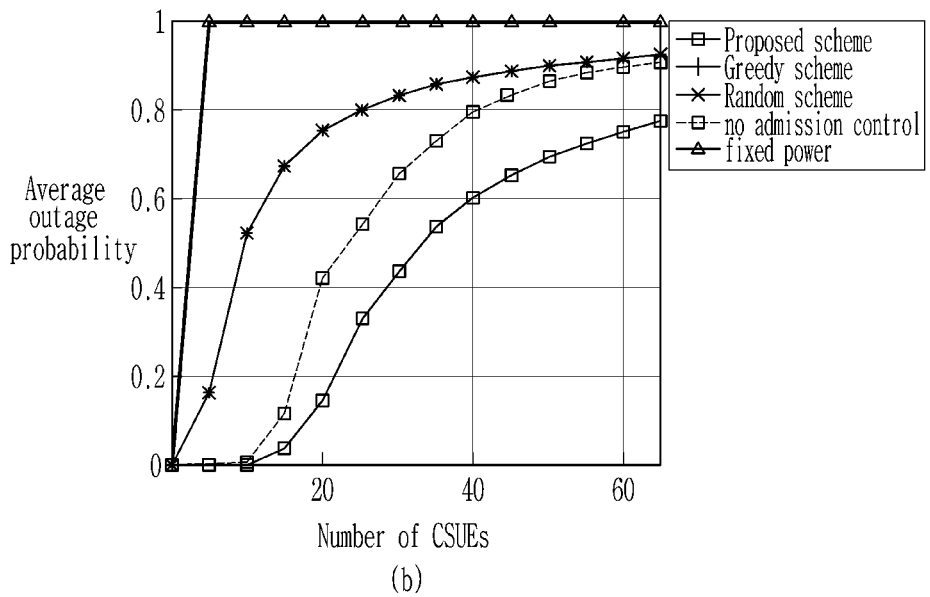

Referring to FIG. 5, a method according to an exemplary embodiment of the present invention is compared with four existing schemes, that is, a greedy scheme, a random scheme, a no admission control scheme, and a fixed power scheme.

FIG. 5A shows a result of the number of CSUEs versus average total throughput and FIG. 5B shows the number of CSUEs versus an average outage probability of the CSUE.

Through FIGS. 5A and 5B, it can be seen that the method according to an exemplary embodiment of the present invention outperforms other methods in total throughput and outage probability.

As described above, an exemplary embodiment of the present invention provides a new framework for sub-channel and power allocation in the uplink cognitive small cell network. Through an exemplary embodiment of the present invention, the problems of the sub-channel and power allocation are formulated as the optimization problem, and the total data transmission rate in the uplink data transmission may be maximized while protecting the macro base station and guaranteeing the minimum data transmission rate requirements of the provided small cell users.

While this invention has been described in connection with what is presently considered to be practical example embodiments, it is to be understood that the invention is not limited to the disclosed embodiments, but, on the contrary, is intended to cover various modifications and equivalent arrangements included within the spirit and scope of the appended claims.

The invention claimed is:

1. A method for allocating an uplink resource by cognitive small cell user equipment in a cognitive small cell network, the method comprising:
   forming a sub-channel-specific preference relationship for each of all possible sub-channels;
   transmitting an access request for a sub-channel having a maximum preference relationship to a small cell manager;
   receiving an answer for the access request;
   determining whether the access request is admitted through the answer,
   when it is determined that the access request is admitted, performing power allocation for each access-determined sub-channel by using transmission power information transferred from the small cell manager; and
   performing data transmission through the access-determined sub-channel by using allocated power,
   wherein when it is determined that the access request is rejected, the transmitting to the small cell manager is repeatedly performed until the access request is admitted.

2. The method of claim 1, further comprising:
   before the forming of the sub-channel-specific preference relationship,
   receiving possible sub-channel information from a small cell base station through broadcasting.

3. The method of claim 1, wherein:
   the sub-channel-specific preference relationship is formed by assuming uniform transmission power to all possible sub-channels.

4. The method of claim 3, wherein:
   the sub-channel-specific preference relationship is estimated by utility values of all possible sub-channels, and
   the utility values are calculated by the following relationship equation $$U_{nm}(k) = R_{nm}^k$$

where $R_{nm}^k$ represents a data transmission rate of a small cell user n when the small cell user n uses sub-channel k with respect to a small cell base station m, and
   the $R_{nm}^k$ is calculated by using the following relationship equation $$R_{nm}^k = B_k \log_2 \left( 1 + \frac{g_{nm}^k P_{nm}^k}{g_{nm}^k P_{k0}^k + \sigma^2} \right)$$

Where $B_k$ represents a bandwidth of sub-channel k, $g^{nmk}$ is a channel gain between small cell user equipment n and a small cell base station m, $P_{nm}^k$ represents power allocated between small cell user equipment n and the small cell base station m, $g_{km}^k P_{k0}^k$ represents a interference level of a macro user k in the small cell base station m, and $\sigma^2$ represents Gaussian noise at the small cell base station.

* * * * *